INVENTORS
Alejandro Martinez Quirós
&
Ramón Martorell Adzeries
BY Richard... 
ATTORNEYS

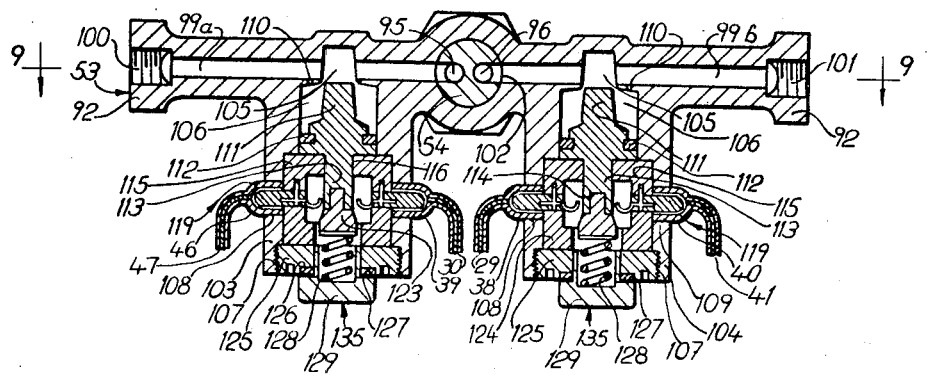

United States Patent Office 3,273,116
Patented Sept. 13, 1966

3,273,116
SAFETY SYSTEM FOR HYDRAULIC BRAKES
Alejandro Martínez Quirós and Ramón Martorell Adzeríes, Barcelona, Spain; said Quirós assignor to Anthonio J. Gijon and Alejandro Martinez Fornaguera
Filed Mar. 11, 1963, Ser. No. 264,198
3 Claims. (Cl. 340—60)

This invention relates to improvements in hydraulic brakes, especially those installed in automobile vehicles, in order to make the driving of said vehicles substantially safer.

It is a fact that at present any hydraulic brake losing a part of the brake fluid therein contained, loses at the same time and automatically its effective braking power.

It is also a fact that when such an event happens, for example in an automobile vehicle having an installation of hydraulic brakes, the person driving said vehicle is not only left helplessly deprived of being able to bring the vehicle to a complete standstill by means of the hydraulic brakes, but also left completely unaware of said inability until he tries to stop the vehicle by operating the brake pedal when he suddenly becomes aware that said vehicle he is driving will not stop. It is obvious that the latter fact places him in a real mortal danger, especially if he is operating the brake pedal to try to avoid a collision.

It is also a fact that many accidents of automobile vehicles are due to losses of brake fluid and that far too many human lives are being lost due to this fact.

A further prevailing fact is that so far nobody, while driving an automobile vehicle, actually knows whether there is a sufficient reserve of brake fluid in the brake fluid tank feeding the hydraulic brakes. It is obvious that if, due to any reason, the brake fluid contained in the brake fluid tank is exhausted and air from the atmosphere penetrates into the brake fluid pump and, through said pump, gets into the rest of the installation of hydraulic brakes, said hydraulic brakes will not work.

It is a usual fact that in most instrument panels of automobile vehicles many controlling instruments are present such as speedometers, temperature gauges, gasoline gauges, oil pressure gauges, ammeters, and similar instruments which, though highly useful to drivers, have neither been devised to prevent accidents nor to give actual safety both to the vehicle and to the driver.

Still there is a further prevailing fact consisting in that the point of application of the power made by the hydraulic brakes on the brake drums finds itself in the brake shoe linings (which must have a given thickness if they are to perform their function properly) and that if wear has thinned these linings beyond a safe degree it can originate a loss of brake fluid at the brake cylinders due to excessive clearance of the brake shoes. In such an instance, if the person driving said automobile vehicle operates the brake pedal in order that said hydraulic brakes can bring said vehicle to a complete standstill, said automobile vehicle will not stop itself swiftly, whereby the vehicle passengers and driver can be exposed to an accident through a collision.

Quite aware of these and other facts the inventors set themselves, in the public interest, to find a solution which tended to avoid as many accidents as possible of those originated by the aforesaid malfunctions in the hydraulic brakes, having eventually devised a system wherein a plurality of detecting means are installed in the hydraulic brakes in order to detect any contingency occurring in them. Said detecting means are electrically connected to signaling means installed also in said automobile vehicle within the visual and audible scopes of the driver of said automobile vehicle so that such driver may thus be duly informed of any occurring contingency and be therefore enabled to make full use of the knowledge communicated to him by means of the system which is the object of the invention herein described.

Therefore an object of this invention is that the means detecting that a brake fluid loss is present prevent the continuation of said loss, stopping the conduct whereby the pump feeds brake fluid to the installation of hydraulic brakes in that part of it where the loss or leak is taking place, separating it from the intact portion of the installation of hydraulic brakes.

Another object of this invention is that, by means of the brake fluid remaining in the intact part of the installation of hydraulic brakes, said intact part may retain its full braking power and thus the driver may bring said vehicle to a complete standstill, that is to say, if said automobile vehicle has four wheels and a leak takes place, for instance in the installation serving either of the front wheels of the vehicle, then it will be the installation serving both rear wheels which will retain its full usual braking power and vice versa.

Still another object of this invention is to automatically warn the driver driving said automobile vehicle, by luminous and sonorous signalling means placed or installed within the visual and auditive scopes of said driver, that a loss of brake fluid, or else a loss of pressure of said broke fluid in the conduits of the hydraulic brakes—that incidentlly means that a leak is present somewhere in the installation of hydraulic brakes—is taking place or has taken place. Said luminous signalling means immediately informs said driver as soon as the brake fluid loss starts, independently of the fact that said driver operates or not the brake pedal of said automobile vehicle, which will enable said driver to act immediately as prudence advises him in the then prevailing circumstances.

There is still another object of this invention, which is to keep said driver likewise informed, while he is driving, of whether there exists a sufficient quantity of brake fluid within the brake fluid tank feeding the pump or pumps and through said pump or pumps all the hydraulic brakes, such information preventing that said tank may inadvertently get totally empty of brake fluid, either due to leaks, losses, consumption, evaporation or to other reasons, and therefore there exists then the danger that air may get into the pump and through it into the hydraulic brakes, which will cause that said brakes will not work.

There exists also another object of this invention, which consists in keeping said driver of said automobile vehicle informed of whether the thickness of all brake shoe linings of all the wheels of said automobile vehicle lies still within the safe range for if they did not all lie within said safe range, despite the perfect efficiency of the rest of the installation of hydraulic brakes, said automobile vehicle could not be brought quickly to a complete standstill and, besides, through an extreme thinness of said linings due to wear, a loss of brake fluid can take place at the brake cylinders through an excessive clearance of the brake shoes beyond self-adjustment.

With the system, object of this invention, any diminution of the quantity of brake fluid contained in the whole installation of hydraulic brakes of an automobile vehicle is totally and constantly kept under control. Said control being exercised by said system on the whole installation of hydraulic brakes right since the filling up of the brake fluid tank feeding said installation, and as far as where the brake shoes are forced to move through the pressure exerted by the pump and transmitted by the brake fluid to the brake cylinders. Such a control does not only allow to detect and signal every possible loss or leak of brake fluid, but also to avoid the continuation of that very same loss or leak, separating the part having said loss or leak from the rest of the installation and keeping at the same time braking power in the vehicle.

These and other objects, advantages and features of the invention will become more fully apparent as reference is had to the accompanying specification and drawings, wherein:

FIG. 8 is a sectional view of the device encompassing the detecting and stopping means of a possible brake fluid loss in the installation of hydraulic brakes of a vehicle with two wheel axes, wherein the equal devices shown at both sides are in a normal position before any possible loss or leak of brake fluid.

FIG. 9 is a vertical sectional view taken along the line 9—9 of FIG. 8 wherein the connection and fixation of the device with the only outlet of the pump is shown.

FIG. 10 is a sectional side view of the screw, packing, and spiral spring ready to be installed, as they are installed in both detecting and stopping devices shown in FIG. 8.

FIG. 11 is a sectional side view of either guiding supports of either detecting and stopping devices shown in FIG. 8.

FIG. 12 is a top plan view of FIG. 11 showing the position of the blind orifices for the fixation of the contacting assemblies in either device shown in FIG. 8.

FIG. 13 is a sectional side view of one of the contacting assemblies in either detecting and stopping devices shown in FIG. 8.

FIG. 14 is a plan frontal view of FIG. 13.

FIG. 15 is a top plan view of the head of the screw shown in a vertical position in FIG. 9, showing the arrows for the proper installation thereof.

Figure 1:
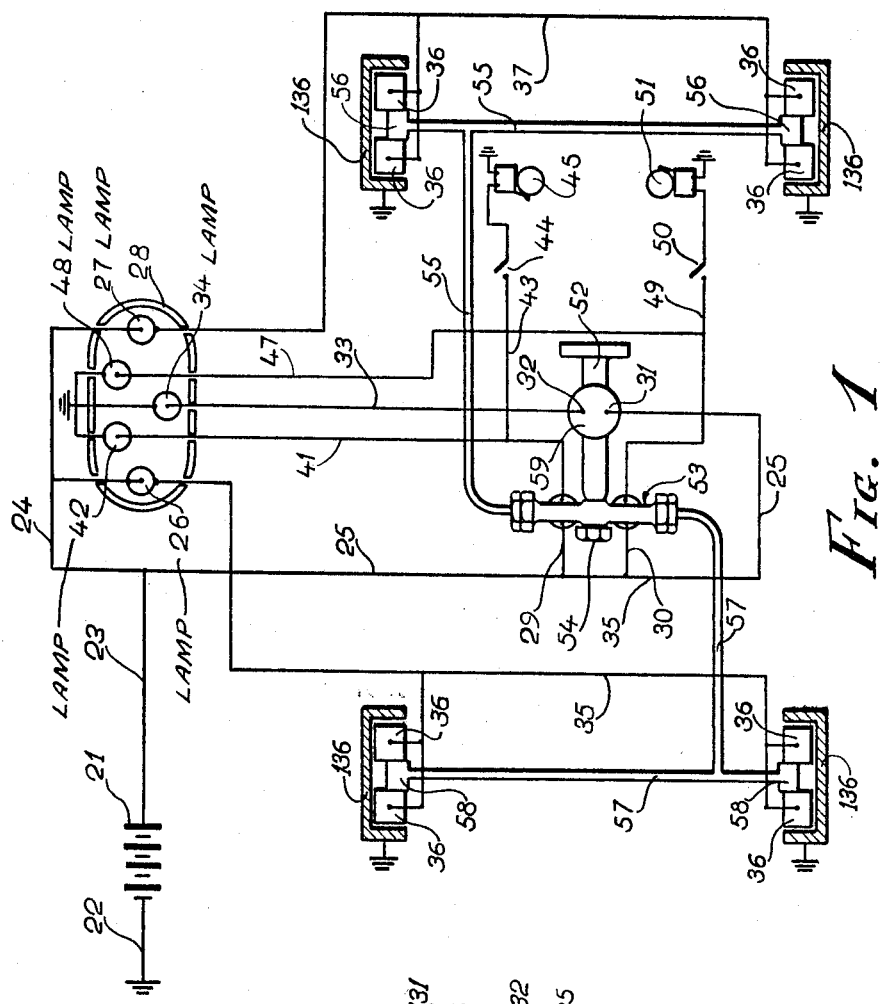
FIG. 1 is a diagrammatic representation of the system, object of this invention, with all the devices and contrivances thereof and its electrical connections and electrical installation.

The invention hereinafter described, although seemingly complex has been devised in order to economically complement the already existing types of hydraulic brakes, in such a way that a wide diffusion of the invention may be possible and that said invention may be manufactured at a cost so that mass-produced automobile vehicles do not become more expensive in an excessive measure. It must be also pointed out that, however independent the different means hereinafter described may seem, said means have been contrived to give a total safety against any brake fluid loss in the whole installation of hydraulic brakes of an automobile vehicle and to serve above all to that purpose. Other advantages of this invention are to be considered as incidental.

Hence, being as it is a safety system to detect, signal and stop losses of brake fluid in installations of hydraulic brakes, it encompasses a number of means among which, one contrived to prevent a possible discontinuation of the feeding of the installation of hydraulic brakes with brake fluid, for a lack of brake fluid in the brake fluid tank— said tank actually constituting a substantial part of the hydraulic brakes—is to be considered as a real loss, which, as any other loss, would hamper the safety of the people in the automobile vehicle. This invention also provides means meant to control the extent of wear of the brake shoe linings, for, if said linings should exceedingly become thin, they might originate brake fluid leaks at the brake cylinders, and through said leak or loss, a lack of braking power.

It must also be mentioned that the following order of description does not imply at all a preference of one means or of a device above the other ones, and that throughout this specification an automobile vehicle possessing two axes of wheels is being used as an illustrative example, without limiting the scope of the invention thereto, whereupon each axis possesses two wheels, therefore the example encompasses a four-wheeled automobile vehicle.

Referring now to the drawings:

As it is a safety system directly connected to an electric circuit, the electrical installation connecting the detecting, signalling, and stopping means will be described in the first place, what will considerably simplify all further references.

Figure 3:
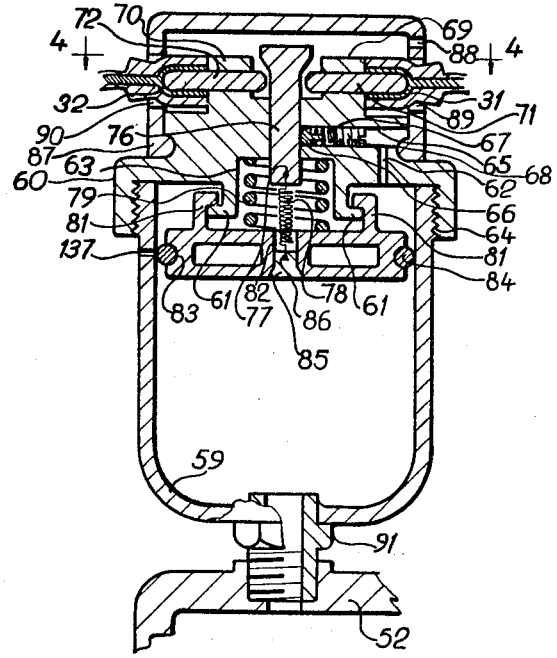
FIG. 3 is a sectional view of the brake fluid tank, empty, with the detecting means of the corresponding device installed in said tank.

The battery 21 (FIG. 1) grounded to earth by the cable 22, supplies an electric current to the circuit by means of the general feeding cable 23 which feeds the live cables 24 and 25. The live cable 24 supplies current to the lamps 26 and 27 of the signal dial 28. The live cable 25 feeds the cables 29 and 30 and the plug 31 in the brake fluid tank (FIG. 3).

The other plug 32 in the brake fluid tank (FIG. 3) is connected to the cable 33. The other end of the cable 33 being connected to the lamp 34 (FIG. 1) which is connected to earth, otherwise called ground.

The lamp 26 (FIG. 1) of the signal dial 28 will become grounded or connected to earth by means of the cable 35 (FIG. 1 and FIG. 2), said cable being connected to the detecting means placed in the brake shoe linings 36 (FIG. 2) of the front wheels.

The lamp 27 (FIG. 1) of the signal dial 28 will become grounded or connected to earth by means of the cable 37 connected to the detecting means placed in the brake shoe linings 36 of the rear wheels of the automobile vehicle of this example.

The live cable 29 supplies current to the live plug 38 (FIG. 8) corresponding to the detecting and stopping means of possible losses of brake fluid from the installation of hydraulic brakes corresponding to the rear wheels of said automobile vehicle.

The live cable 30 supplies similarly current to the plug 39 (FIG. 8) corresponding to the detecting and stopping means of possible losses of brake fluid from the installation of hydraulic brakes corresponding to the front wheels of said automobile vehicle.

The plug 40 (FIG. 8) by means of the cable 41 (FIG. 1 and FIG. 8) will light the lamp 42 of the signal dial 28 and through the derivation cable 43 and the switch 44 will also render sonorous the sound-producing device 45, corresponding to brake fluid losses in the installation of hydraulic brakes of the rear wheels of said automobile vehicle.

The plug 46 (FIG. 8) by means of the cable 47 (FIG. 1) will light the lamp 48 in the signal dial 28 and through the derivation cable 49 and the switch 50 will also render sonorous the sound-producing device 51, corresponding to brake fluid losses in the installation of hydraulic brakes of the front wheels of said automobile vehicle.

Said plugs 31, 32, 38, 39, 40, and 46 of this example can be any other kind of electrical connection used in similar electric circuits and systems.

Said conventional sound-producing devices 45 and 51 may consist of a buzzer, a ringing bell, a claxon, a siren or any other similar device, or else any conventional apparatus capable of reproducing speech, in which by means of a tape, plate wire, or any other similar means, may emit warning sentences previously recorded in said means, said sentences supposed to be, or really being proffered by any being, whose image be placed so near of the lamps 42 and 48, which are the lamps to signal losses or leaks of brake fluid in the installation of hydraulic brakes, that said lamps throw light on said image, or illuminate said image, at the same time that the warning sentences are reproduced by means of said reproducing device which constitutes the sound-producing device 45 or the 51, according to the wheel axis whose installation of hydraulic brakes has had said loss or leak.

As the sound-producing devices 45 and 51 of any type described may annoy the driver already warned, switches 44 and 50 have been respectively provided so that the sound-producing devices can be disconnected and thus rendered silent if the driver so wishes. It is foreseen that the luminous signals emitted by all the lamps mentioned continue being emitted until the misfunction or damage causing the loss or leak of brake fluid has been satisfactorily repaired.

The mechanical installation of the system, object of this invention is also diagrammatically represented in FIG. 1 wherein 52 is a conventional brake-fluid pump, 53 is the detecting, circuit-making, and stopping device which forms part of this invention (FIG. 8), said device 53 being fastened to the pump 52 by means of the distributing screw 54, which also is a part of this invention (FIG. 9 and FIG. 15).

To an end of the device 53, a conventional conduit 55 is connected said conduit 55 being full of brake fluid as far as the brake cylinders 56 corresponding to the rear wheels of said automobile vehicle. To the other end of the device 53, a conventional conduit 57 is connected, said conduit 57 being full of brake fluid as far as the brake cylinders 58 corresponding to the front wheels of said automobile vehicle.

The conventional lamps 26, 27, 34, 42, 48 and the likewise conventional sound-producing devices 45 and 51, constitute the signalling means of the safety system, object of this invention, as herein described.

Figure 6:
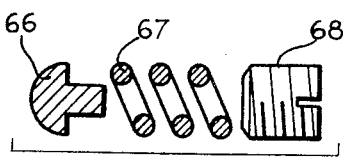
FIG. 6 is an exploded view of the regulating means for the contacting piece shown in FIG. 7.

In order to warrant the functioning of the installation of hydraulic brakes it is indispensable that the feeding of brake fluid to said installation be never discontinued or interrupted. With that purpose it has been foreseen to provide a conventional brake fluid tank 59 (FIG. 3) with a lid 60 in insulating material, said lid 60 being provided inside with two lid interlocking catches 61, said lid 60 having an air inlet 62 to allow the admission of air into the conventional tank 59, a cylinder-shaped central hole 63 with two different diameters, and a screw-thread 64, whereupon the wider diameter of the hole 63 is inside the lid and the screw-thread 64 allows a sure fixation of the lid 60 to said conventional tank 59. Said lid 60 has also a horizontal cylinder-shaped screw-threaded bore 65 perpendicular to the smaller diameter of the hole 63 and communicating with said hole 63, said bore 65 lodging a pressing piece 66, a cylindrical spiral spring 67 and a screw 68. (FIG. 6).

Figure 5:
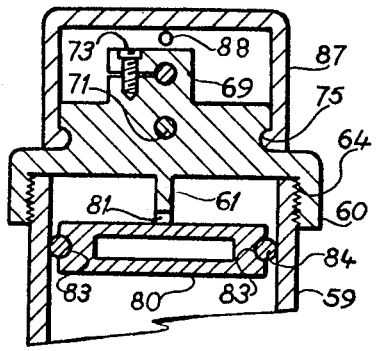
FIG. 5 is a sectional side view of FIG. 4, as seen along the line 5—5 of said FIG. 4.
Figure 4:
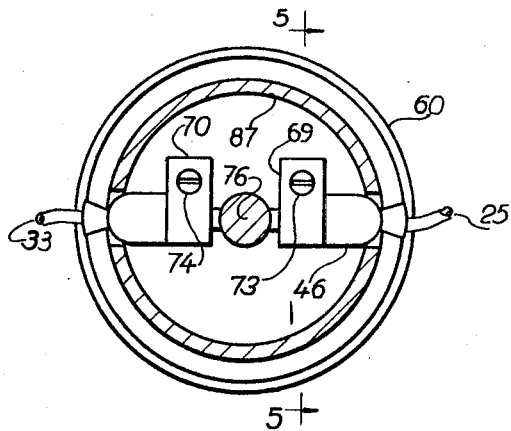
FIG. 4 is a top plan view of FIG. 3, as seen along the line 4—4 of said FIG. 3.

In the upper part of the lid 60 there are two salient parts 69 and 70 (FIG. 3 and FIG. 4), each salient part crossed by aligned horizontal bores, wherein the fixed terminals 71 and 72 in the shape of cylinders are lodged, the inside ends of said terminals being facing each other in a truncated-cone shape. In the salient parts 69 and 70 there are two small vertical screw-threaded bores, wherein the screws 73 and 74 (FIG. 4 and FIG. 5) are screwed in whereupon they fix respectively the fixed terminals 71 and 72. The lid 60 possesses also in its outer part a circumferential groove 75 which surrounds the upper cylindrical protuberance of said lid 60. Inside the hole 63 of said lid 60 a mobile contacting piece 76 is introduced, said contacting piece 76 being of an electricity conducting material (FIG. 7) and having a horizontal small hole 77.

Figure 7:
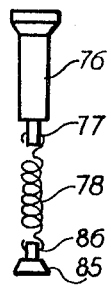
FIG. 7 is a plan front view of the contacting piece, the spring, and the anchoring piece already shown installed in FIG. 3.

When the mobile contacting piece 76 has been placed through the hole 63 and before screwing the lid 60 to the convential tank 59, the spiral spring 78 is fixed into the small hole 77 of the piece 76 by one end of said spring 78 (FIG. 3 and FIG. 7). In the section of wider diameter of the hole 63 situated inside the lid 60, a cylindrical spiral spring 79, in whose inner diameter the previously mentioned spiral spring 78 can freely move, is introduced. Inside the spiral spring 79 also the lower end of the piece 76 when pulled by the spiral spring 78 can freely move.

Inside the conventional tank 59 it is foreseen that a cylindrical float 80 with two interlocking catches 81 matching the previously mentioned catches 61 of the lid 60 will float on the brake fluid contained in said tank 59. Said float 80 having besides the catches 81 a central hole 82 and a peripheric groove 83, wherein an O-ring 84 is lodged.

Inside the conventional tank 59 and with the float 80 an anchoring piece 85 in insulating material provided with a transversal hole 86 will be situated. The free end of the spiral spring 78 is fixed after being introduced through the central hole 82 of said 80, to the transversal hole 86 of the anchoring piece 85. Then the float 80, by pressing the spiral spring 79, is fixed to the lid 60 by interlocking the catches 61 of the lid with the catches 81 of the float.

In the circumferential groove 75 of said lid 60, the salient rib of the flexible dust cover 87 (FIG. 3 and FIG. 4) is introduced, being said dust-cover 87 provided with an air inlet 88 and with two aligned side orifices 89 and 90, said latter orifices 89 and 90 being there to allow the plugs 31 and 32 to be connected to the contacts constituted by the fixed terminals 71 and 72.

The conventional tank 59 equipped with the whole device just described which constitutes a part of the invention, installed in the lid 60, which also constitutes a part of the invention, is conventionally connected and attached by its bottom to the conventional brake fluid pump 52 by means of the also conventional union 91.

The whole device installed in the lid 60, except the pieces 66, 67 and 68 installed within the bore 65 of said lid 60, constitute the detecting means of the safety system object of this invention, which will constantly control the level of the brake fluid contained in said brake fluid tank 59 and will detect the minimum level of the brake fluid contained therein, said minimum level having been previously adjusted at will by means of the regulating means constituted by the pieces 66, 67 and 68 installed within the horizontal cylindrical screw-threaded bore 65 made into the lid 60 (FIG. 3).

The driver of the automobile vehicle of the example herein described can thus know with certainty whether the quantity of brake fluid contained in the conventional tank 59 exceeds, or not, of the minimum previously adjusted by him, or by whom he has ordered to adjust, during the filling up of the installation of hydraulic brakes with brake fluid, and such a knowledge coming to him without his leaving his position behind the steering and driving means of the automobile vehicle of the example.

Another feature of the invention is constituted by the detecting and stopping device 53 (FIG. 8 and FIG. 9), which is also a circuit-maker, and consists of a hollow body 92 connected to the brake fluid pump 52 by means of the distributing screw 54, which also constitutes a fixing piece and a part of this invention, during which installation an upper packing 93 and a lower packing 94 (FIG. 9) are to be interposed. The distributing screw 54 (FIG. 9) has two cylindrical drilled bores 95 and 96, which are parallel to each other and are drilled perpendicular to the head of said screw 54 but not reaching said head, and two aligned side bores 97 and 98 of a greater diameter than the cylindrical bores 95 and 96, which form respectively two conduits with no communication between each other inside the screw. The head of said screw 54 bears on the top some signals, which can be arrows (FIG. 15) which coincide exactly with the axis of the two aligned side bores 97 and 98.

The hollow body 92 previously mentioned is provided with a longitudinal cylindrical bore 99 which reaches from the screwed end 100 to the other screwed end 101 opposed to it, having in its center a cylindrical central bore perpendicular to said bore 99, said central bore 102 lodging the distributing screw 54. Said hollow body has also two equal cylindrical projections 103 and 104 (FIG. 8), which are parallel to each other and also perpendicular both to the longitudinal bore 99 and to the central bore 102, in the example shown in FIG. 8 and in FIG. 9.

The cylindrical projections 103 and 104, both alike, being hollow inside and having therein and in the part intersecting the bore 99 a truncated-cone-shaped section 105, the axis of each section 105 being the same that the ones of each cylinder-shaped chamber 106, said chamber having different diameters of section along its axis, the end thereof with the greatest diameter having a female screw 107 made inside, everything inside each hollow cylindrical projection 103 and 104 of said hollow body 92. Moreover each projection 103 and 104 has two aligned holes 108 and 109, placed in the example shown parallel to the bore 99, and also a vent 110, each one communicating the bottom of the chamber 106 with the longitudinal bore 99. Inside each projection 103 and 104, a stopping piston 111 in insulating material is lodged, said piston 111 having a cylindrical shape with a salient in the form of a truncated cone, said form of the salient matching the section 105 also with the shape of a truncated cone, in the body 92. Round the periphery of its cylindrical portion, the piston 111 has a groove where a packing 112 providing a seal is lodged. The other end of the piston 111 has a cylindrical salient 113 with a smaller diameter, inside which salient 113 a screw-thread bore 114 has been made, said bore 114 having the same axis that the piston 111, therefore being centered in the other end of the same body forming the piston 111. In the cylindrical chamber 106 a guiding support 115 also in insulating material is introduced (FIG. 11 and FIG. 12). Said guiding support 115 having a central hole 116, which provides a guide to the cylindrical salient 113 of the piston 111, as well as two semicircular recesses 117 in the deeper part of which there exist two blind orifices 118. Said semicircular recesses 117 coincide with one half of the aligned holes 108 and 109 of each projection 103 and 104. Into said holes 108 and 109 of each projection 103 and 104, two contacting assemblies 119 are installed (FIG. 13 and FIG. 14), therefore each device 53 has four such assemblies 119, whereof two are installed in the projection 103 and the other two in the projection 104. Said assemblies 119 are constituted by cylindrical rods 120, each rod having a longitudinal cut wherein an end of an elastic, curved strip 121 in electricity conducting material is introduced, said end of the strip 121 having a hole through which a fixing pin 122 will be introduced, said cylindrical rods 120 having also a small drilled hole to allow the introduction of the corresponding fixing pin 122. The hole in each cylindrical rod 120 and the hole in the strip 121 being so placed, that on introducing the fixing pin 122 through them, said rod 120 and strip 121 become fixed by said pin 122, an end of said pin protruding outside said rods 120, so that they may lodge inside the blind orifices 118 of the supports 115 and the orientation of the assemblies 119 within each projection 103 and 104 being thus guaranteed. The immobility of said assemblies 119 is thus also guaranteed and secured (FIG. 13).

In the screw-thread bore 114 of the cylindrical salient 113 of the piston 111 in insulating material, the contact piece 123 in electrically conducting material (FIG. 8) is screwed. Then another guiding support 124 of the same dimensions, shape and material that the other guiding support previously described 115 (FIG. 11 and FIG. 12), but which may lack of the blind orifices 118 which are not necessary in said support 124, is placed inside each projection 103 and 104 in such a way that the semicircular recesses 117 thereof coincide with the other free half of the aligned holes 108 and 109. Both guiding supports 115 and 124 forming a sealed box insulating the fixed contacts formed by the assemblies 119 and the mobile contacting piece constituted by the piece 123 screwed to the mobile piston 111.

To the female screw 107 of each projection 103 and 104 a nut 125 having a central hole, and being screw-threaded inside and outside, is screwed by means of its outer screw. Said nuts 125 have a recess 126 wherein a packing 127 is placed or can be held. A cylindrical spiral spring 128 is introduced into the central hole of the nut 125 and then a hollow screw 129 is screwed into the inner screw of the nut 125. Said screw 129 (FIG. 10) pressing the packing 127 against the nut 125 and the spring 128 against the piece 123. Said nut 125 pressing the lower guiding support 124 against the cylindrical rods 120 and against the upper guiding support 115 and guaranteeing thus a perfect seal and immobility to the contacting assemblies 119.

In order to fix and connect the hollow body 92 to the conventional brake fluid pump 52, the screw 54 is introduced into the cylindrical central bore 102, screwing it then to the conventional brake fluid pump 52 (FIG. 9) in such a way that with the maximum necessary pressure of said screw 54, the signals or arrows on the head of said screw 54 (FIG. 15) remain aligned with the longitudinal axis of the body 92, whereupon the side bores 97 and 98 will be in perfect communication and alignment with the longitudinal bore 99 and this bore 99 will have been divided into two equal halves separated by the wall inside the screw 54, which separates the two inner conduits formed by the bores 95 and 97, and 96 and 98 respectively. Said maximum necessary pressure of the screw 54 to get that indispensable alignment and communication between the two portions of the bore 99 and each separate conduit inside the screw 54, can be adjusted by the adequate thickness of the packings 93 and 94 in each case.

Thus it is possible to set in direct and independent communication with the brake fluid pump 52, each respective installation of hydraulic brakes corresponding to the front wheels and rear wheels of the automobile vehicle of this example.

All the devices which constitute the device 53 including the distributing screw 54 (FIG. 8 and FIG. 9) consituting the detecting and stopping means of any loss of brake fluid, of the safety system object of this invention wherein the pieces 111, 112, 120, 121, 122, 123, 127, 128, and 129 of each projection 103 and 104 constitute the detecting means and the pieces 111, 112, 115, 123, 124, 125, 127, 128, and 129 the stopping means, which assisted by the screw 54 constitute the means separating the spoiled or damaged part of the installation having said loss or leak of brake fluid, from the intact part thereof.

The simplicity of the example herein described is obvious, as well as the ingenuity thereof, by using the detecting means of the brake fluid loss or leak in such a way that, at the same time they are transmitting informing signals to the driver by means of the lamps 42 and 48 connected to said detecting means, they utilize the depression originated by said loss or leak, and by means of the stopping means incorporated in the way just described, the automatic separation of the part of the installation of hydraulic brakes having said loss or leak from the intact part, can be carried out.

It is to be pointed out that the fixing piece constituted by the distributing screw 54 can have as many independent conduits inside as axes of wheels the automobile vehicle may have. The device 53 will then have as many ramifications as axes of wheels, one projection 103 or 104 being installed on each ramification with all the devices therein contained to perform the same duty just described.

Another feature of this invention is constituted by the detection of the extent of wear on the outer surface of the brake shoe linings and the subsequent signalling to the driver thereof by adequate means.

The inventors have devised and contrived three embodiments of said means, the efficiency of which is practically equivalent.

Figure 2:
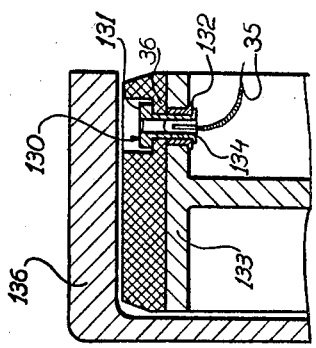
FIG. 2 is a sectional view of the detecting means of the device corresponding to the brake shoe linings, according to one of the embodiments foreseen, also with the representation of its electrical connection.

The first embodiment foresees the detecting means as represented in FIG. 2, that is to say, constituted by an assembly 130. Said assembly 130 being made up by a metallic hollow rivet 131, the hollowness of said rivet being in the end opposed to the rivet head, and by an insulating bush 132. In each one of the brake shoe linings 36 (FIG. 1 and FIG. 2) of the automobile vehicle of the example, one or several holes being provided. Said brake shoe linings 36 being installed on brake shoes 133, said shoes 133 having also holes, alike in number, dimension and position as the ones in the linings 36. To install the assembly 130 in a brake shoe lining 36, the rivets 131 are introduced into said holes with the rivet head away from the shoes 133 after having been previously introduced into insulating bushes 132, which will insulate said rivets from said shoes 133, for, as the rivets are to have a length superior to the thickness of one half of a new brake shoe lining added to the thickness of the brake shoe corresponding to that lining, they will protrude inside said brake shoes 133, (FIG. 2), when introduced so deep into the brake shoe lining 36 that their heads be exactly at half the whole thickness of said lining 36, said rivets 131 will have also been introduced through the brake shoes 133. By making a mouthlike riveting 134 of the hollow protruding part of said rivets 131, so that, with the interposition of the insulating bush 132, they be fixed to the brake shoes 133, the assembly 130 will have been installed in each brake shoe lining 36 of said automobile vehicle. Said assembly 130 being connected to an electric circuit or system, by fastening an end of the cable 35 to the inside of the hollow of the rivet 131 by adequate means through the mouth formed by the riveting 134, according to the plan represented in FIG. 1.

The second embodiment of said detecting means provides that said cable 35 reach directly to a half of the thickness of the lining 36, through the same holes previously described of the linings 36 and of the shoes 133, but wrapped in an insulating bush that insulates it from the shoe 133 and allow its attachment to said shoe.

The third embodiment of said detecting means provides a metallic strip, wire net, or connection, lodged inside the mass constituting the brake shoe lining and placed parallel to the friction surface thereof to a distance of said surface equivalent to the half of the thickness of a conventional new brake shoe lining, said metallic strip, wire net, or connection being connected to the cable 35 by adequate means.

The structure of the safety system just described is assisted of an electric circuit or system in the example herein disclosed. It is obvious that said system might be also constituted by a magnetic system or by an electromagnetic system operating the different means described.

Hereinafter the procedure for the installation of the safety system, object of this invention, in the hydraulic brakes of said automobile vehicle is described, as well as the adjustment of said system so that it may work in the case of a misfunction.

In an automobile vehicle, which in the example being described, has four wheels, two wheels on each axis, what does not imply a limitation of this invention as to the number of wheels, or number of axes of said vehicle, a conventional brake fluid tank 59 is installed connected, by the also conventional union 91, to the also conventional pump 52, said pump attached and connected by means of the distributing screw 54, which is a part of this invention, to the detecting and stopping device 53, also a part of this invention, whose screwed end 100 is connected to the conventional conduit 57 feeding with brake fluid the brake cylinders 58 of the front wheels, and whose screwed end 101 is connected to the conventional conduit 55 feeding with brake fluid the brake cylinder 56 corresponding to the rear wheels, said detecting and stopping device 53 having inside each cylindrical projection 103 and 104 thereof, each projection installed at either side of the distributing screw 54 inside the body 92, a stopping piston 111 with its packing seal 112, a guiding support 115 in insulating material, two contacting assemblies 119, a contact piece 123 screwed to the screwed bore 114 of the salient 113 of the stopping piston 111, a guiding support 124 of insulating material and a nut 125 pressing and immobilising within each projection 103 and 104 the guiding support 124, the contacting assemblies 119 and the guiding support 115.

Thus the automobile vehicle is ready for the filling up and the so-called draining of the installation of hydraulic brakes. To perform such operations brake fluid is introduced into the conventional tank 59 which feeds the conventional pump 52 by various usual means. From the pump 52 the brake fluid penetrates into the bore 96 drilled inside the distributing screw 54 and on to the side bore 98 filling the longitudinal bore 99b, the hollow section 105 with the shape of a truncated cone and the free part of the chamber 106 having the smallest diameter of the projection 104, as well as the small vent 110, and from the screwed end 101 of said bore 99b and by means of the conventional conduit 55 thereto connected reaching the conventional brake cylinders 56 corresponding to the rear wheels, whereupon all the just described installation remains filled with brake fluid.

Simultaneously the brake fluid from the pump 52 will have penetrated into the bore 95 drilled likewise inside the distributing screw 54, and on to the side bore 97 filling the longitudinal bore 99a, the hollow section 105 with the shape of a truncated cone and the free part of the chamber 106 having the smallest diameter of the projection 103, as well as the small vent 110, and from the screwed end 100 of said bore 99a and by means of the conventional conduit 57 will have reached the conventional brake cylinders 58 corresponding to the front wheels, whereupon also this just described installation will remain filled with brake fluid.

The brake fluid fills now completely the whole installation of hydraulic brakes of the automobile vehicle of the example and will have driven out all the air of said installation, whereupon the brake fluid presses the piston 111 against the top of the guiding support 115 inside each projection 103 and 104. As soon as the aforesaid filling-up and draining operation has been terminated, an assembly 135 (FIG. 10) is screwed into the inner screw of the nut 125 of each projection 103 and 104, whereby the spiral spring 128 will be pressing the contacting piece 123 screwed to the salient 113 of the piston 111, and the plugs 39 and 46 are connected to the contacting assemblies 119 of the projection 103, and the plugs 38 and 40 to the contacting assemblies 119 of the projection 104.

Said contacting piece 123 will remain in complete immobility in the position just described until a depression inside the installation of hydraulic brakes originated by a loss or leak of brake fluid, allows the piston 111 to advance towards the section 105 shaped as a truncated cone. It is to be remembered that said piece 123 is screwed to the salient 113 of the piston 111. In the case that said loss occurs in the installation serving the front wheels of said vehicle, before that the piston 111 inside the projection 103 may complete its movement stopping the conduit constituted by the longitudinal bore 99a by means of its tip, which has the shape of a truncated cone, said piston being pushed by the pressure exerted by the spring 128 against the contacting piece 123 screwed to said piston 111, said contacting piece 123 will contact the elastic curved strips 121 of the assemblies 119 (FIG. 13) and link both opposed assemblies 119, linking thus the live circuit fed by the live cable 30 which by means of the connection 39 in the form of a plug gets to one of the assemblies 119 installed in the projection 103, with the other assembly 119 in the opposite side of said projection 103, whereupon the current will flow through the connection 46 and the cable 47 which now will feed the installation previously described serving the front wheels; this will cause the lamp 48 in the signal dial 28 to emit luminous signals and that simultaneously, or after a short lapse of time if another system is chosen, the sound-producing device 51 will emit acoustic or sonorous signals, both communicating the driver that a loss or leak of brake fluid has occurred in the installation of hydraulic brakes corresponding to the front wheels of said vehicle.

The lamp 48 will keep on emitting luminous signals, either intermittent or continuous, until the damage or misfunction that has originated the brake fluid loss or leak be duly repaired. On the other hand, the sound-producing device 51 can be disconnected at will by means of the switch 50 (FIG. 1).

It is a feature of this invention, that the detection and signalling be carried out by the very same assembly constituted by the piston 111 and the contacting piece 123 thereto screwed, said piston 111 constituting by itself the piece stopping said loss. It is obvious however that both functions can be carried out independently if wished by adequate means, but the union of said functions in the same device has uncontestable advantages of efficiency and economy, for when the driver is informed by the luminous signals of the lamp 48, the truncated cone-shaped tip of the piston 111 is pushing the brake fluid out of the free portion of the chamber 106 through the vent 110 and the hollow section 105 also in the shape of a truncated cone, into the longitudinal bore 99a, until said truncated cone-shaped tip of the piston 111 lodges itself into the hollow section 105 matching its shape blocking the conduit constituted by the longitudinal bore 99a of the hollow body 92, whereupon the installation having said loss or leak of brake fluid will remain separated from the conventional pump 52.

Another attribute of this invention is the fact that the conventional pump 52, thanks to the safety system object of this invention, will keep on performing its duties in the intact rest of the installation of hydraulic brakes through the conduit made up by the bores 96 and 98 inside the distributing screw 54.

On the other hand if the loss or leak of brake fluid takes place in the installation of hydraulic brakes corresponding to the rear wheels, the device installed inside the projection 104 will work in the same manner just described. In this case the circuit will be closed by the contacting piece 123 of said projection 104, which will link the live circuit fed by the live cable 29 which reaches through the connection 38 one of the assemblies 119 of said projection 104, with the other assembly 119 on the opposite side thereof which through the connection 40 will transmit the electric current to the cable 41 which will now feed the electric circuit or system previously described for the rear wheels of said automobile vehicle, causing the lamp 42 to emit luminous signals and that the sound-producing device 45 will emit sonorous or acoustic signals, which at the same time inform the driver that a loss or leak of brake fluid is taking place in the installation of hydraulic brakes corresponding to the rear wheels. Likewise the lamp 42 will keep on emitting luminous signals until the damage or misfunction that has originated the loss or leak of brake fluid be duly repaired. On the other hand, the sound-producing device 45 will be, at will, disconnected by the driver by means of the switch 44 (FIG. 1).

The way, by which said loss or leak is stopped, is quite alike that described previously for the front wheels, in which case the stopped longitudinal bore will be the 99b and the conventional pump 52 will keep on performing its duties in the intact rest of the installation of hydraulic brakes, by means of the same distributing screw 54 which constitutes a part of this invention, but through the conduit inside said screw 54 formed by the bores 95 and 97.

The above description is the part of the invention meant to protect the installation of hydraulic brakes from losses or leaks of brake fluid from the conventional pump 52 to the conventional brake cylinders 56 and 58 corresponding to both axes of wheels of the vehicle here set as an example. In order to prevent that leaks may occur at the brake cylinders 58 corresponding to the front wheels, due to an unduly great clearance of the brake shoes 133, said clearance being originated by an exceedingly great extent of wear on the brake shoe linings 36, the assemblies 130 provided to each lining 36 (or else the other detecting means described in the other two embodiments) will detect said exceedingly great extent of wear on the linings 36, when the head of the rivet 131 (or else respectively the portion of cable 35 inside the insulating bush, and the metallic strip or wire net lodged within the brake shoe lining as described previously) protrudes out of the linings 36—any of them—belonging to the front wheels, due to said linings 36 becoming unduly thin due to the wear caused mainly by friction, and the driver operates the brake pedal or any other system of brakes working hydraulically, whereupon the detecting means constituted either by the assembly 130, or the ones of the other two embodiments, will establish a contact with the brake drum 136 (FIG. 2), which through the head of the rivet 131 and the cable 35 (or else, respectively, directly by means of said cable 35 inside the insulating bush—said bush, insulating the cable 35 from the brake shoe 133, but being uncovered by the same wear that thins out the lining—or by means of the metallic strip or wire net and of said cable 35) will close the circuit, whereupon the lamp 26 will be grounded or connected to earth, what will light said lamp 26, due to its being fed by the live cable 24.

Thus the driver of said automobile vehicle, every time he operates the brakes, will be informed by the signal of the lamp 26 that, at least, one brake shoe lining corresponding to the front wheels has reached the safety limit, which preferably can be one half of said thickness of the new lining, thus receiving a clear suggestion that all the brake shoe linings coresponding to the front wheels must be immediately replaced to guard against possible losses of brake fluid through leaks at the brake cylinders.

It is obvious the advantage of said preventing devices just described, as they tend to avoid the possibility that simultaneous losses of brake fluid take place in the installation of hydraulic brakes serving the front wheels and the one serving the rear wheels of said automobile vehicle, for, although both losses would be dutifully warned to the driver by the signalling means of the safety system object of this invention, the simultaneity of action of the stopping means due to lossess of brake fluid, would leave said vehicle deprived from braking power.

The same description just made for the brake cylinders 58 corresponding to the front wheels, can be taken for the brake cylinders 56 corresponding to the rear wheels of the automobile vehicle of this example, in that case it is the lamp 27 which will be emitting luminous signals and the cable 37 which will be connected to the assemblies 130 in the linings 36, when the extent of wear of the brake shoe linings 36 of the rear wheels will have caused the head of the rivet to protrude out of the surface of the lining, belonging to a rear wheel.

All the parts of this invention so far described would lose their protecting efficiency for the driver and other passengers of said vehicle, if the feeding of the conventional pump 52 with brake fluid from the conventional brake fluid tank 59 were neglected, or else the possible losses of brake fluid within the very conventional pump 62 through damage of the rubber packings thereof or other causes were not considered.

For this reason the conventional brake fluid tank 59—which in the FIG. 3 is represented vertically and empty of brake fluid—is provided with the lid 60 and the detecting means constituted by the controlling mechanism of the brake fluid level inside said tank 59, along with the regulating means to adjust the minimum level wished.

After having filled the whole installation of hydraulic brakes with brake fluid by the usual procedures in the way previously described, of course, before installing said lid 60 on the tank 59, up to a mark 137 in said tank, which may be a vent, when screwing said lid 60 with all the device in it installed as shown in FIG. 3, the level of the fluid inside the tank will press the float 80 upwards increasingly until compressing the spring 79, whereupon the interlocking catches 81 of the float 80 will separate themselves from the interlocking catches 61 of the lid 60. As on screwing the lid 60 to the tank 59, said lid gyrates, the catches 81 on the float 80 will no longer be in alignment and interlocking themselves with the catches 61 of the lid 60. In that moment the float pressed by the slight pressure exerted by the spring 79 will rest freely on the surface of the brake fluid filling said tank 59 up to that mark 137. If now, for any reason a leak takes place in the very tank 59, in the union 91 fixing said tank to the pump 52, or in the union of any type connecting said conventional tank 59 with the conventional pump 52, as well as in the very pump 52, and this independently so that said tank may form a single body with said pump or not, it is obvious that the level of the brake fluid contained in said tank 59 will descend, and on its surface the float 80 will descend assisted by the slight pressure of the spring 79. At the same time the float 80 will cause the anchoring piece 85 to descend with it, whereupon the spring 78 which links said anchoring piece 85 to the contacting piece 76 as previously described, will stretch continuously until the level of the brake fluid contained in said tank 59 be the minimum level previously adjusted during the filling up and the draining operations by means of the regulating means also described, until the pulling force exerted by the stretched spring 78 be superior to the pressure exerted by the cylindrical spiral spring 67 (FIG. 6) against the pressing piece 66, whereupon the contacting piece 76 (FIG. 3) will be drawn by said spring 78 and obliged to contact the cylindrical contacts 71 and 72 also described as fixed terminals, thus closing the electric circuit of said detecting and signalling means of the minimum level of the brake fluid contained in said tank 59. When this circuit is closed, the current from the live cable 25 feeding the connection 31 will reach the terminal 71 and through the link constituted by the mobile contact piece 76, the opposite terminal 72 and through the connection 32 to the cable 33 which will light the lamp 34 in the signal dial 28.

It is to be remarked that all the information given by all the above described signalling means, is given to the driver without his leaving his post behind the steering and driving means of said automobile vehicle.

Summarizing, being the purpose of this invention to obtain an absolute control of the losses or leaks of brake fluid in the whole installation of hydraulic brakes of automobile vehicles by means of the safety system just described, the inventors believe to have obtained said absolute control by means of the joint use of the devices and contrivances of all the means described, for, the omission of any of them, would substantially decrease the almost total protection given by this system, which is a mechanical and electrical safety system.

Although what has been previously described and shown constitutes only one of the preferred forms of this invention it is obvious that numerous changes and alterations can be made in it. Therefore it is to be understood that this invention is not to be limited to the form shown and described but by the scope of the claims that follow.

We claim:

1. In an automobile having a plurality of brake shoes, cylinders for said brake shoes, separate conduits supplying a brake fluid to said cylinders for actuating said brake shoes, and a pedal-operated pump for transmitting the brake fluid to said cylinders, a safety device comprising a hollow body having a central portion and tubular portions connected with said central portion, said central portion being directly connected with said pump, each tubular portion having an end connected to a separate conduit for transmitting brake fluid from said pump to that conduit, a separate cylindrical projection integral and communicating with each tubular portion, separate pistons movable within said projections and contacted by the brake fluid on only one face thereof, and separate springs engaging said pistons, each of said springs being adapted to press the piston engaged thereby into the tubular portion and automatically interrupt communication between said pump and one of said conduits when there is drop in pressure of the brake fluid therein.

2. In combination with an electrical signalling device, a safety device in accordance with claim 1, further comprising contacts connected with the electrical signalling device and carried by said projections and said pistons, said contacts energizing said signalling device when at least one of said pistons has been pressed into a tubular portion of said body.

3. A safety device in accordance with claim 2, having a separate signalling device for each of said pistons.

References Cited by the Examiner

UNITED STATES PATENTS

| | | | |
|---|---|---|---|
| 2,046,316 | 7/1936 | Bentz | 340—242 |
| 2,110,342 | 3/1938 | Salvo | 340—52 |
| 2,239,348 | 4/1941 | Wirtanen et al. | 340—52 X |
| 2,535,940 | 12/1950 | Malvin | 200—82 |
| 2,636,090 | 4/1953 | Branschofsky. | |
| 2,774,958 | 12/1956 | Aldasoro | 340—242 |
| 2,781,432 | 2/1957 | Ferrara et al. | 200—84 |
| 2,824,187 | 2/1958 | Fanning | 200—84 |
| 2,835,757 | 5/1958 | Chellemi et al. | 200—61.4 |
| 2,857,584 | 10/1958 | Gibson | 340—242 X |
| 2,866,866 | 12/1958 | Laplante | 200—84 |
| 2,894,093 | 7/1959 | Frey | 200—84 |
| 2,907,844 | 10/1959 | Lindsey | 200—84 |
| 2,965,730 | 12/1960 | Regoli et al. | 200—82 |
| 3,148,364 | 9/1964 | Engles et al. | 340—242 |

NEIL C. READ, *Primary Examiner.*

A. H. WARING, *Assistant Examiner.*